United States Patent [19]
Allen et al.

[11] 3,771,424
[45] Nov. 13, 1973

[54] HYDRAULIC FLOW AMPLIFIER VALVE

[75] Inventors: Thomas E. Allen, East Peoria; Gordon W. Johnson, Joliet; Richard L. M. Sears, Washington; Chester L. Strantz, East Peoria; John B. Waggoner, Joliet, all of Ill.

[73] Assignee: Caterpillar Tractor Co., Peoria, Ill.

[22] Filed: Nov. 2, 1970

[21] Appl. No.: 86,305

Related U.S. Application Data

[62] Division of Ser. No. 712,747, March 13, 1968, Pat. No. 3,566,749.

[52] U.S. Cl. ................... 91/446, 91/433, 91/448
[51] Int. Cl. ... F15b 11/16, F15b 13/42, F15b 13/06
[58] Field of Search ............... 91/6, 445, 446, 468, 91/447, 448, 455; 60/52 S

[56] References Cited
UNITED STATES PATENTS

| | | | |
|---|---|---|---|
| 1,908,504 | 5/1933 | Bone | 91/455 X |
| 2,981,287 | 4/1961 | Caslow | 91/446 X |
| 3,260,325 | 7/1966 | Brown et al. | 60/52 S |
| 3,394,545 | 7/1968 | Thompson et al. | 60/52 S |
| 3,403,512 | 10/1968 | Malott | 60/52 S |

*Primary Examiner*—Irwin C. Cohen
*Attorney*—Charles M. Fryer et al.

[57] ABSTRACT

A hydraulic flow amplifier valve assembly for regulating fluid flow to steering jacks. A steering control valve receives fluid directly from a pump and is pilot operated by fluid from a conventional metering unit to provide amplified flow of pump fluid to the jacks. A blocker valve passes fluid from the steering valve during steering motion of the jacks and otherwise isolates the jacks to prevent fluid loss. A lock valve protects against steering wheel slippage during overpressure conditions and also permits pilot fluid provided by the metering unit to operate the steering jacks in the event of pressure failure.

3 Claims, 5 Drawing Figures

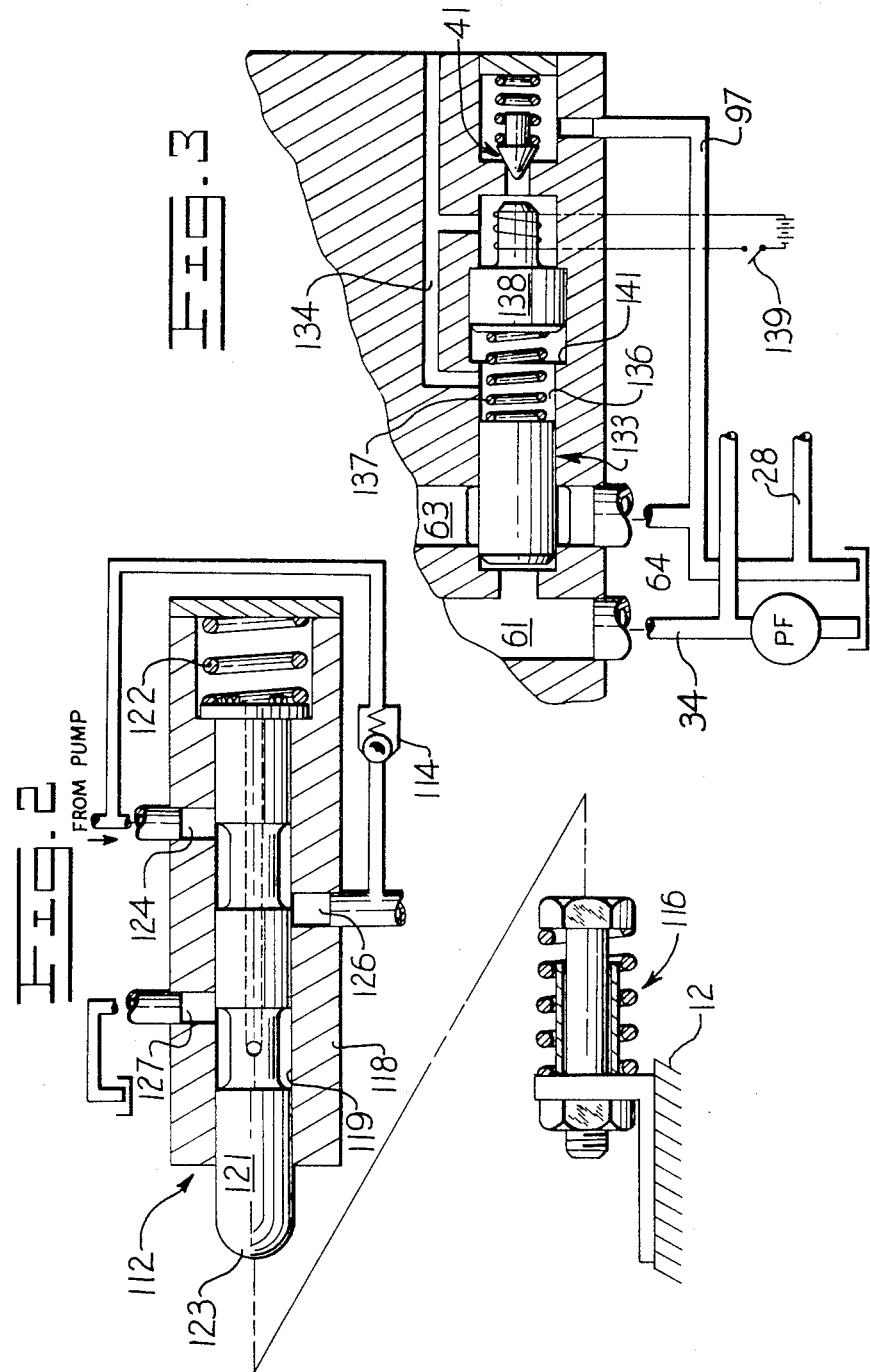

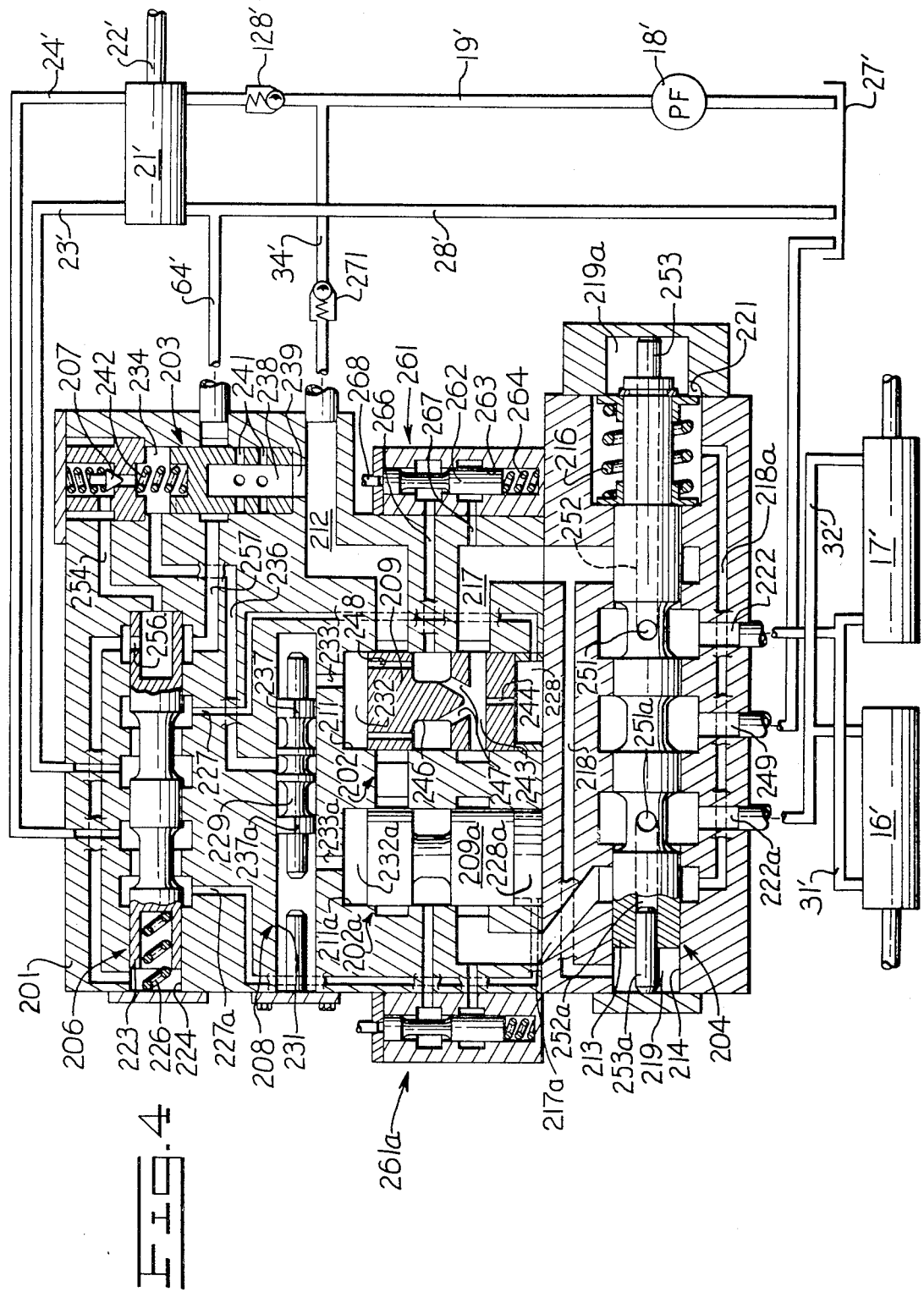

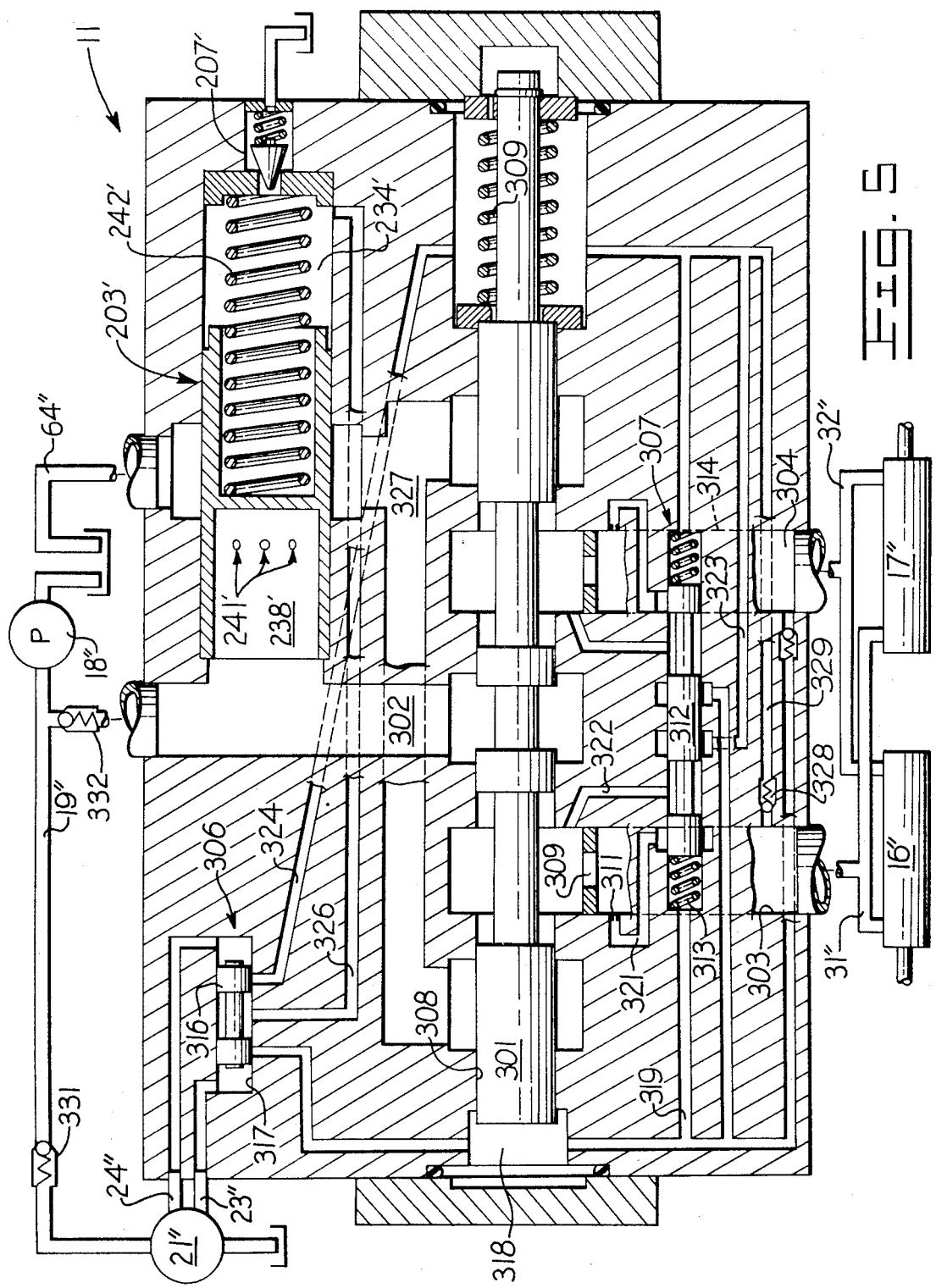

HYDRAULIC FLOW AMPLIFIER VALVE

This application is a division of application Ser. No. 712,747, now U.S. Pat. No. 3,566,749.

It is well-known in the prior art to employ flow control and pressure compensating valves to regulate fluid flow to hydraulic motors such as jacks disposed between pivoted frames of an articulated vehicle. However, such steering control systems and necessary follow-up linkages are complex and require considerable amounts of space for installation of all the hydraulic lines, valves and associated hardware. Such systems are also susceptible to damage from road shock. Further, in the event of pressure failure, steering of the vehicle through relatively inadequate mechanical linkage is difficult for the operator and may result in mechanical failure. These problems are not limited to hydraulic steering motor controls. They may arise in a generally similar manner where hydraulic motors are employed to operate a variety of equipment such as various material handling implements where flow amplification is also desirable. For purposes of simplicity, the present invention is described with particular reference to hydraulic steering control systems.

The present invention provides a simple, compact flow amplifier valve assembly which has a control valve for regulating the flow of fluid from a source to hydraulic motor means. The control valve is pilot operated by fluid flow from a conventional metering means which is capable of precise flow regulation. The control valve permits fluid flow from the pump to the motor means which flow is amplified at a preselected ratio relative to the pilot flow. The control valve preferably has pressure compensating means to insure that the flow ratio is volumetrically maintained regardless of pressure variations in the system.

In addition to providing a flow amplifier valve as described above, it is a further object to provide means for blocking pilot flow from the metering means in the event maximum system pressure is exceeded.

It is another object to provide means permitting the motor means to be directly actuated by pilot flow in the event of pressure failure in the steering system.

Fulfillment of the above objects eliminates the need for any mechanical follow up linkage when the flow amplifier valve is employed for steering control. In addition, the steering control system is made relatively resistant to damaging effects from road shock and the like. An additional advantage of the present valve assembly lies in the large fluid volume which it may provide to the steering means in proportion to its size.

Another object is to provide simple means for accomplishing dual ratio operation of the motor means, for example, dual ratio steering in the steering control system referred to above.

Other objects and advantages of the present invention are made apparent from the following description with reference to the accompanying drawings wherein:

FIG. 2 illustrates a valve from the control system of FIG. 1 for establishing a minimum turning radius of the vehicle;

FIG. 3 illustrates, as an alternate embodiment, a solenoid operated piston assembly for association with a steering control valve of the flow amplifier valve assembly of FIG. 1 to permit the optional use of dual steering ratios; and FIGS. 4 and 5 illustrate alternate embodiments of the flow amplifier valve assembly of FIG. 1.

Figure 1:
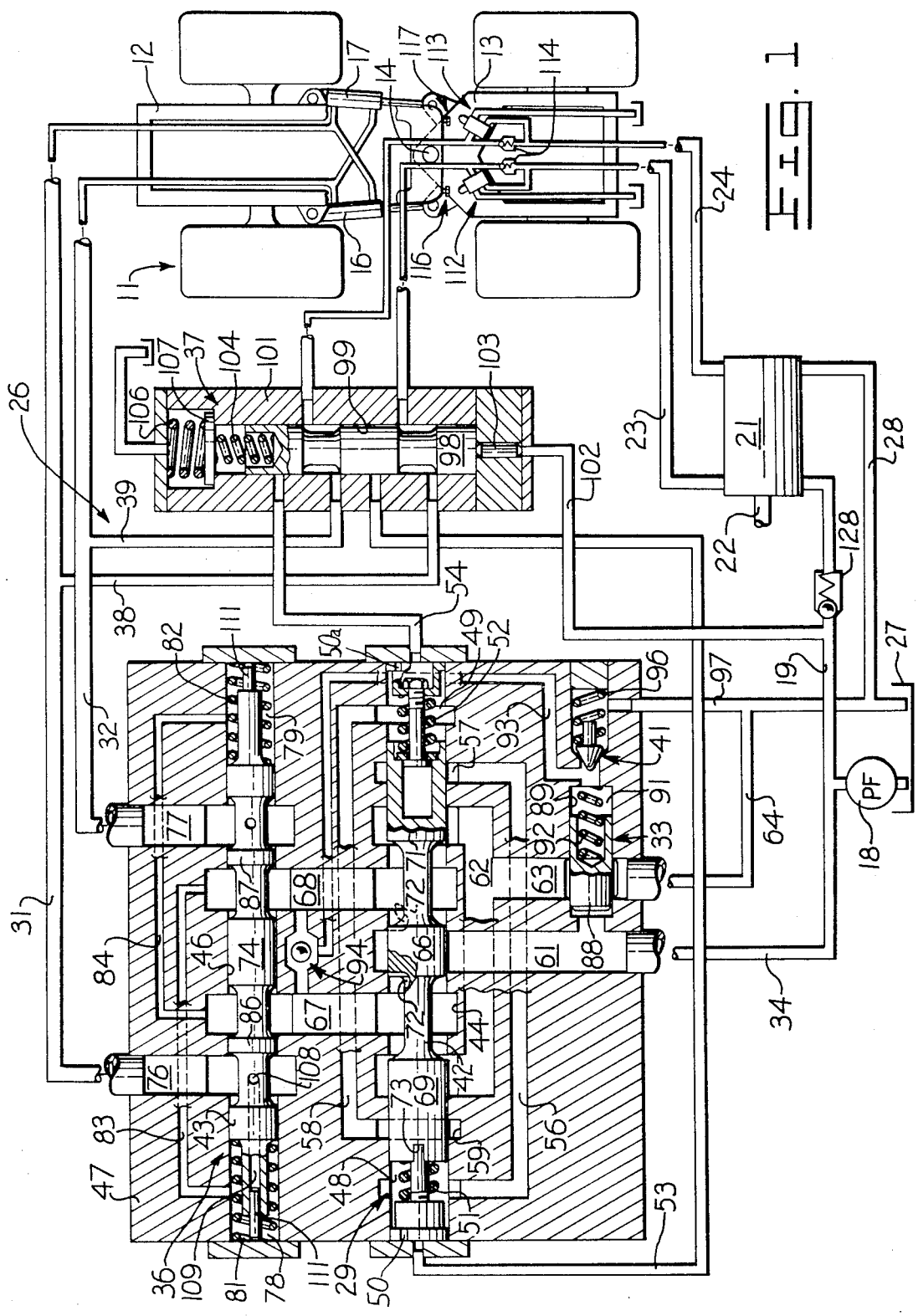
FIG. 1 is a schematic representation of a flow amplifier valve assembly in the hydraulic steering system of a vehicle.

The present invention is described below with reference to an articulated vehicle having a pair of hydraulic steering jacks between two pivoted frame sections and a rotatable fluid metering unit operable by the steering wheel of the vehicle. However, it will be apparent that the present invention is employable on other vehicles having different hydraulic steering motor means as well as for other equipment adaptable to operation by hydraulic motors.

Referring to FIG. 1, an articulated vehicle 11, having frames 12 and 13 pivotally joined at 14, is steered by hydraulic means comprising a pair of hydraulic steering jacks 16 and 17 conventionally positioned between the articulated frames. Pressurized fluid for operating the jacks is provided by a fluid source, for example, the pump 18, through a conduit 34 and also communicates through a conduit 19 to a metering unit 21. The metering unit is of a conventional type controlled by the steering wheel (not shown) of the vehicle through a shaft 22. Conduits 23 and 24 connect the metering unit with a flow amplifying valve assembly 26 which responds to the metering unit to direct fluid to the steering jacks in a manner described below. The metering unit transfers fluid from conduit 19 to one of conduits 23 and 24, depending on the direction in which the metering unit is rotated, only when the shaft 22 is being rotated with the steering wheel. Resulting fluid flow is proportional to the rate at which the metering unit is rotated. While the metering unit is transferring fluid into one of conduits 23 and 24, it communicates the other conduit to a drain tank 27 through a conduit 28.

Summary of the Flow Amplifier Valve Assembly of FIG. 1

The flow amplifier valve assembly 26 comprises a symmetrical steering control valve 29 which is pilot operated by fluid from the conduits 23 and 24 to direct fluid at an amplified rate to the steering jacks through one of conduits 31 and 32 depending upon the direction of turn desired. The steering control valve is arranged so that amplified fluid flow to the jacks is related to pilot flow through the corresponding conduit 23 or 24 by a preselected ratio.

Pressure compensation of fluid flow to the steering jacks is accomplished by a load piston 33 associated with the steering control valve so that the pressure of fluid flow to the jacks varies as necessary according to changing conditions such as terrain, desired rate of turn and weather conditions. The load piston responds to fluid pressure downstream of the steering valve and additional spring force to modulate the pressure of direct fluid flow from the pump 18 through a branch 34 of conduit 19 to the steering control valve.

A symmetrical blocker valve 36 is interposed between the steering control valve and the steering jacks. Its function is to permit fluid to freely pass from the steering valve to the steering jacks in response to rotational motion of the metering unit. Otherwise, the blocker valve normally isolates the steering jacks from the steering control valve to fix the positions of the steering jacks. However, when external forces which tend to turn the vehicle create overpressures in the steering jacks above a preselected level, the blocker valve vents the excess fluid pressure to drain through the steering valve to protect the hydraulic components from damage.

A lock valve 37 communicates with and regulates fluid flow from the conduits 23 and 24 to the steering valve or through bypass conduits 38 and 39 which connect respectively with conduits 31 and 32 to the steering jacks. The lock valve responds to pressure in conduit 19 to perform numerous functions. During normal operation, it isolates the bypass conduits 38 and 39 from the conduits 23 and 24 so that there is no feedback from the steering jacks to the metering unit and steering wheel. When pressure within the flow amplifier valve exceeds a preselected maximum operating pressure, it also isolates the flow amplifier valve assembly from the conduits 23 and 24. Such excessive pressure could result from overpressure in the steering jacks or malfunctioning of a component of the control valve system. The flow amplifier valve assembly includes poppet valve means 41 to relieve such excessive pressures. The lock valve thus hydraulically locks the metering unit during excess pressure relief through the poppet valve 41 to prevent steering wheel slippage.

The lock valve 37 performs an additional function in combination with the blocker valve 36 upon a pressure failure, resulting for example, from stoppage of an engine (not shown) driving pump 18. In that event, at least limited hydraulic control is maintained over the steering jacks since the conduits 31 and 32 from the steering jacks are blocked by the blocker valve and communicated directly to the conduits 23 and 24 by the bypass conduits 38 and 39 and the lock valve. In this condition, rotation of the shaft 22 causes the metering unit to draw fluid from tank 27 through the pump 18 and conduit 19. This fluid is transferred to one of the conduits 23 and 24 and directed to the steering jacks. Although the metering unit must be rotated a substantially greater number of times to accomplish an equivalent steering maneuver, at least limited hydraulic steering control is always maintained. This feature also obviates the necessity for mechanical follow-up linkage to accomplish the same purpose.

Description of the Embodiment of FIG. 1

To describe the above components in greater detail, the steering control valve and blocker valve have individually symmetrical spools, 42 and 43, respectively, which are disposed for longitudinal motion in respective bores 44 and 46 formed by a valve housing 47. The ends of the steering spool define chambers 48 and 49 at the ends of the steering spool bore with centering springs 51 and 52 disposed respectively in the end chambers 48 and 49 to normally position the steering spool as shown in FIG. 1. Conduits 53 and 54, in respective communication with end chambers 48 and 49, are also disposed for respective communication with conduits 23 and 24 through the lock valve 37. Fluid is directed through one of the conduits 23 and 24 and one of the conduits 53 and 54 for pilot operation of the steering spool according to operation of the metering unit 21 and the lock valve 37 in a manner described below. An internal passage 56 communicates the chamber 48 at the left end of the steering spool with an annular recess 57 formed by the steering spool bore around the right end of the normally positioned control spool 42. Similarly, another internal passage 58 communicates the right end chamber 49 with an annular recess 59 about the left end of the control spool. Hydraulic fluid from the pump 18 and the conduit 34 is introduced into the steering spool bore by a fluid inlet passage 61. A drain passage 62 is in communication with the steering control spool bore 44 at each side of the inlet passage 61 and is also in free communication to drain 27 by another internal passage 63 and a conduit 64. The steering control spool 42, in its normal central position, has a central land 66 disposed to block substantially all fluid flow from the inlet passage 61 into the steering control spool bore 44. Two chambers 67 and 68 communicate with the steering spool bore at each side of inlet passage 61 respectively so that when the steering spool is shifted, one of the chambers 67 and 68 is in downstream communication with inlet passage 61 across the central land 66 and the other chamber is communicated to drain through the steering spool bore and passage 62. When the steering spool is in its normal central position, lands 69 and 71 formed at its ends permit limited drainage of fluid into the passage 62 from chambers 67 and 68 respectively. A slot 72 is machined into each edge of the central steering spool land 66 such that minor movement of the spool first allows a limited amount of fluid flow across the normally positioned steering spool to provide for modulation when minor steering corrections are made. As the spool is moved further, more of the slot is opened to pass a progressively larger amount of the main flow. Each end of the steering control spool 42 also has a slot, as at 73, which is just out of communication with the adjacent annular recess 59 or 57 when the steering spool is in its normal position.

The blocker spool bore 46 is also in communication with both chambers 67 and 68 and has a central land 74 which prevents communication between the two chambers. Outlet passages 76 and 77 communicate with conduits 31 and 32 respectively as well as with the blocker spool bore 46. Blocker spool 43 also defines chambers 78 and 79 at the left and right ends of the blocker spool bore 46 respectively. Centering springs 81 and 82 are disposed in the two end chambers 78 and 79 to normally position the blocker spool as illustrated in FIG. 1. An internal passage 83 communicates the chamber 68 with the chamber 78 at the left end of the blocker spool while a similar internal passage 84 communicates the chamber 67 with the chamber 79 at the right end of the blocker spool. A land 86 on the blocker spool 43 normally prevents fluid communication between chamber 67 and outlet passage 76. However, when the steering spool is shifted rightwardly to communicate fluid from inlet passage 61 to chamber 67, that fluid pressure is communicated by internal passage 84 into chamber 79 so that the blocker spool 43 is shifted leftwardly and the land 86 permits the fluid to pass freely from chamber 67 into outlet passage 76 and from there to the steering jacks by means of conduit 31. The blocker spool 43 has a similar land 87 which normally prevents fluid communication between chamber 68 and outlet passage 77. When the blocker spool 43 is shifted rightwardly, the land 87 permits fluid to pass freely from chamber 68 to the steering jack through conduit 32.

The load piston 33 provides pressure compensation in the inlet passage 61 during either a right or a left turn. The load piston has a face 88 in fluid communication with the inlet passage 61. The load piston is disposed for longitudinal motion in a bore 89 which crosses the drain passage 63 and communicates to the inlet passage 61. A chamber 91 is formed at the rear of the load piston and contains a spring 92 which urges the load piston leftwardly toward the inlet passage 61 so that its face 88 normally meters fluid flow between the inlet passage 61 and the drain passage 63. An internal passage 93 is in communication with the load piston chamber 91 and with both chambers 67 and 68 by means of a shuttle valve 94 so that fluid pressure downstream of the steering spool is communicated into the load piston chamber regardless of the direction in which the vehicle is being turned. The poppet valve 41 communicates with the load piston chamber 91. When pressure in the load piston chamber exceeds a preselected value, the poppet valve is shifted against its spring 96 and communicates the excess pressure from load piston chamber 91 to drain through a conduit 97.

To perform the numerous functions described above for the lock valve 37, it comprises a spool 98 disposed for vertical motion in a bore 99 formed by a housing 101. Fluid pressure in the pump conduit 19 is communicated to the lock valve by a conduit 102 so that it acts upon a slug 103 and urges the slug upwardly against the lock valve spool 98. Upward motion of the lock valve spool 98 is resisted initially by a spring 104 and subsequently by a spring 106 after the lock valve spool engages a washer 107. In the absence of fluid pressure in conduits 19 and 102, such as when an engine (not shown) driving the pump 18 is stopped, the lock valve spool 98 is positioned as shown to communicate the conduits 23 and 24 with conduits 38 and 39 respectively. When normal operating pressure exists in conduit 102, the lock valve spool is urged upwardly against the first spring 104 so that the conduits 38 and 39 are blocked and conduits 23 and 24 are communicated respectively with conduits 53 and 54 for pilot operation of the steering valve spool. When maximum pressure is exceeded within the control valve system, the lock valve spool is urged upwardly against the second spring 106 in a manner described below so that the conduits 23 and 24 are isolated by the lock valve spool.

Operation of the Embodiment of FIG. 1

To describe the operation of the present flow amplifier valve assembly, the blocker valve spool 43 and the steering control valve spool 42 are centrally positioned as shown when the pump 18 is operating and the metering unit 21 is not rotating. Fluid from the pump passes through conduit 34 into the inlet passage 61 to be substantially blocked by the central steering spool land 66. Pressure in the inlet passage 61 accordingly rises and acts against the load piston 33. The load piston chamber 91 is communicated to drain through passage 93, the shuttle valve 94, one of chambers 67 and 68, the control spool bore 44 and drain passage 62. Thus, fluid pressure in inlet passage 61 acting against load piston face 88 is resisted only by the spring 92 so that the load piston is urged rightwardly to communicate inlet passage 61 with drain passage 63 and permit the pump fluid to return to drain through the conduit 64. As noted above, this initial pressure in conduits 19 and 102 shifts the lock valve spool upwardly so that conduits 23 and 24 are in respective communication with conduits 53 and 54. The blocker valve and steering control valve are symmetrical and operate similarly with regard to the other valve components regardless of turning direction. Therefore, operation of the control system is described in detail only for a turning maneuver in one direction, for example, a left turn where fluid is directed to the rod end of steering jack 16 and the head end of steering jack 17 to pivot frame section 12 counterclockwise about point 14 with respect to the frame section 13. For a turn in this direction, the operator rotates the metering unit so that fluid from the pump is transferred in a precisely controlled amount to conduit 23 and then to conduit 53 through the lock valve 37. Fluid from the conduit 53 enters the chamber 48 through a slot 50 and cooperates with the spring 51 to urge the steering spool rightwardly in its bore. Fluid entering the internal passage 56 is blocked by the right end of the steering spool. Thus the steering spool is shifted rightwardly until the slot 73 communicates with the annular recess 59 to relieve pressure in the chamber 48. Fluid in the annular recess 59 passes to drain through the passage 58, chamber 49, conduit 54, the lock valve, conduit 24, the metering unit and conduit 28. The distance which the steering spool is shifted rightwardly is dependent upon the pressure in chamber 48 and accordingly, the speed of rotation of the metering unit. At the same time that the slot 73 enters into communication with the annular recess 59, the central steering spool land 66 commences to meter fluid from the inlet passage 61 into the chamber 67. The volumetric ratio of the pilot fluid flow and pump fluid flow into chamber 67 is determined by the width of the slot 73 compared to the circumference of the central steering spool land 66. Fluid in chamber 67 is blocked from chamber 68 by the shuttle valve 94 but permitted to pass to the load piston chamber 91 through the passage 93. Downstream pressure of the steering control valve 29 thus acts in combination with the spring 92 to urge the load piston leftwardly and tends to block off inlet passage 61 from direct communication with drain passage 63. This interaction of pressures results in pressure compensation within the inlet passage 61 as will be described immediately below. At the same time, fluid from chamber 67 passes through internal passage 84 to chamber 79 at the right end of the blocker valve spool 43. Fluid pressure in chamber 79 urges the blocker valve spool leftwardly so that chamber 67 is in communication with outlet passage 76 and conduit 31. Variable resistance of the vehicle and the steering jacks to turning results in back pressure within the outlet passage 76 and the chamber 67. That back pressure is communicated to the load piston chamber through the passage 93 so that it cooperates with the spring 92 to urge the load piston leftwardly and further limit passage of fluid from the inlet passage 61 to the drain passage 63 across the load piston. Thus, pressure in the inlet passage 61 is compensated so that the steering ratio is unaffected by the variable resistance of the vehicle to turning. The increased pressure in inlet passage 61 also exists in conduit 34 and conduit 19 so that a pressure differential is experienced between its inlet conduit 19 and drain conduit 28 for proper operation of the metering unit.

The volumetric flow ratio for slot 73 and central steering spool land 66 assumes equivalent pressure drops across the slot 73 and the land 66. However, these pressure drops are not equal since the pressure drop across slot 73 is fixed by the centering spring 52 and the pressure drop across the central steering spool land 66 is fixed by the spring 92 in the load piston according to the above description.

Thus, further amplification is established in the flow of pump fluid to the jacks as compared to the flow of pilot fluid across the slot 73 by the varying strengths of the springs 52 and 92.

As fluid is being directed into the rod end of jack 16 and the head end of jack 17, an equal volume of fluid from the head end of jack 16 and the rod end of jack 17 passes to drain through outlet passage 77, chamber 68 and passages 62 and 63.

Once the operator achieves the desired radius turn, discontinued rotation of the metering unit 21 terminates pilot flow through the conduit 53 so that both the steering spool and the blocker spool are returned to their normal position by their centering springs. In this condition, outlet passages 76 and 77 are both isolated by the blocker valve spool to fix the steering cylinders in their desired positions. The steering cylinders are maintained in this position until the operator again commences rotation of the metering unit. To turn further in the same direction, he rotates the metering unit to again direct fluid through the conduit 23 so that the above described process is repeated. On the other hand, to return to straight ahead travel or accomplish a turn to the right, the metering unit is rotated to direct fluid into the conduit 24. In this event, the above operation would also be repeated. However, functions of the steering valve and the blocker valve would be performed by the symmetrically opposite features of those valves so that fluid flow to and from the steering jack 16 and 17 would be reversed.

Provision is made to relieve excessive pressure resulting, for example, from malfunctioning of a portion of the flow amplifier valve assembly or from a road obstruction. In addition to relieving the excess pressure, it is desirable to prevent steering wheel slippage during the period in which excess pressure is present in the control valve system. Steering wheel slippage is exemplified in that excess pressure in the control valve system may prevent the steering jacks from properly responding to the rotation of the steering wheel and the metering units. To describe these functions in relation to the most typical overpressure situation, assume that the vehicle wheels encounter an obstruction which tends to turn the vehicle leftwardly. Overpressure would result in conduit 31 and outlet passage 76 of the valve housing. To relieve such overpressure above a preselected level, each end of the blocker valve spool has an orifice 108 in communication with one of the outlet passages 76 and 77. Each orifice 108 is in communication with an axial bore 109 which is open to the adjacent end of the blocker spool and contains a slug 111. The overpressure appearing in outlet passage 76 from the steering jacks enters the port 108 and the axial bore 109 and interacts between the slug 111 and the blocker spool to urge the blocker spool rightwardly within its bore. The blocker spool land 86 is accordingly shifted rightwardly so that outlet passage 76 is communicated to drain through chamber 67 and passage 62. However, when the steering spool is in its normal position, its land 69 permits only limited flow thereacross into passage 62 so that the overpressure also passes into the shuttle valve 94, shifting it rightwardly to block chamber 68 and then to the load piston chamber 91 through passage 93. The additional pressure in load piston chamber 91 urges the load piston leftwardly to decrease fluid flow from inlet passage 61 to drain passage 63 with the result that fluid pressure in the inlet passage 61 rises in correspondence with the overpressure discussed above. This rising pressure also exists in conduit 34 and accordingly in conduits 19 and 102 so that the lock valve spool is shifted upwardly against the washer 107 and the second spring 106. Thus, by the above action of the lock valve, the conduits 23 and 24 from the metering unit are blocked by the lock valve spool during operation of the poppet valve 41 to relieve excess pressure so that slippage of the steering wheel is prevented. Once the excess pressure is relieved from the system, the poppet valve 41 reseats. In addition, once the overpressure appearing in outlet passage 76 has been reduced to a satisfactory level, the blocker spool returns to its centered position according to its spring so that the steering jacks are again isolated and further turning of the vehicle is prevented.

An additional function of the lock valve in combination with the metering unit is to permit the operator to retain limited hydraulic steering control in the event of a general pressure failure such as could result from stoppage of the engine driving the pump 18. To describe this function, the pump 18 is preferably of a type having vanes which collapse when it is not being driven by the engine so that pressure in conduits 19 and 102 would be rapidly dissipated to the drain 27. Pressure reduction in conduit 102 would result in downward positioning of the lock valve spool according to springs 104 and 106 so that it would communicate bypass conduits 38 and 39 with conduits 23 and 24 respectively from the metering unit. The metering unit is of a positive displacement type so that, when it is rotated, it draws fluid from the tank 27 through the collapsed vanes of the pump 18 and the conduit 19. The fluid is transferred into one of the conduits 23 and 24, through the lock valve to one of the conduits 38 and 39 and then to the steering jacks. During this operation, the load piston 33 and the steering spool 66 blocks off the inlet passage 61 and the blocker spool blocks outlet passages 76 and 77 so that the pilot flow in one of the conduits 31 and 32 does not pass the drain through the flow amplifier valve.

It is additionally desirable to provide limit means to stop a turning maneuver in either direction when the machine approaches its minimum radius capability. To accomplish this purpose, limiting or neutralizer valves 112 and 113 are associated respectively with the conduits 23 and 24 from the metering unit. A check valve 114 is associated with each neutralizer valve by appropriate hydraulic conduits so that the fluid directed to the flow amplifier valve assembly from the metering unit through either of conduits 23 and 24 must pass through the appropriate neutralizer valve. However, fluid being returned to drain through either of conduits 23 or 24 together with the metering unit 21 and the conduit 28 bypasses the neutralizer valve and passes directly across the associated check valve. The neutralizer valves 112 and 113 are associated respectively with stop means 116 and 117 disposed on the opposite frame member 12 of the articulated vehicle.

To describe the structure and operation of neutralizer valve 112, neutralizer valve 113 being similar, reference is made to FIG. 2. The neutralizer valve comprises a housing 118 forming a bore 119. A spool 121 is disposed for longitudinal motion in the bore 119 and is urged leftwardly by a spring 122 so that its left end 123 projects out of the neutralizer valve housing. When the neutralizer valve spool is positioned by the spring as shown, the check valve 114 causes fluid from the pump and metering unit to enter the neutralizer bore through a port 124. The neutralizer valve spool 121 permits fluid from the inlet port 124 to pass to the flow amplifier valve assembly through an outlet port 126. However as the articulated members of the vehicle are pivoted, the spring loaded stop 116 engages the left end of the neutralizer valve spool 121 and urges it rightwardly into the neutralizer valve bore. The stop is spring loaded to permit slight compression to absorb slight overtravel of the steering cylinders. In this condition, its inlet port 124 is blocked from the outlet port 126 and the outlet port 126 is instead communicated to drain through another port 127. The neutralizer valve 112 prevents continued turning of the vehicle once the minimum radius capability of the machine is realized, because interruption of the pilot flow allows the main control valve spool to return to neutral. However, the association of its outlet port 126 with the drain port 127 together with the position of the check valve 114 continues to permit fluid to pass from the flow amplifier valve assembly to drain across the check valve associated with each neutralizer valve so that a turn in the opposite direction may be accomplished and the neutralizer valve does not otherwise interfere with the operation described above.

A check valve 128 (FIG. 1) is disposed across the conduit 19 between the metering unit 21 and the branch conduit 102 to eliminate the possibility of pressure feedback through that line caused by the wheels striking an obstruction of some kind, which could spin the steering wheel and perhaps injure the operator during a manual steering condition.

A modified pressure compensating load piston 133 is illustrated in FIG. 3 and provides a dual ratio steering option for the vehicle. Branched conduit 134 corresponds to the conduit 93 of the load piston 33 in FIG. 1 and communicates fluid pressure to a chamber 136 corresponding to load piston chamber 91 of FIG. 1. The load piston has a spring 137 which is similar to the spring 92 of FIG. 1. The other components are numbered similarly as the corresponding components in FIG. 1 except for the following components which are added in the modification. A solenoid piston 138 is disposed for longitudinal motion in the load piston chamber 136 so that the spring 137 interacts between the load piston 133 and the solenoid piston 138. Normally, the solenoid piston is positioned rightwardly within the chamber 136 so that the load piston 133 functions identically as the load piston 33 of FIG. 1. However, the solenoid piston 138 is electrically actuated by means of a switch 139 so that the solenoid piston is shifted leftwardly against a stop 141 within the load piston chamber 136. Leftward shifting of the solenoid piston increases the strength with which the spring 137 resists rightward shifting of the load piston 133. As discussed above, amplification of fluid flow from the pump to the steering jack in relation to pilot flow is amplified by the strength relation of the spring 137 to another spring 52 (see FIG. 1). Increasing the strength of the spring 137 provides for greater amplification of the flow rate. For example, if the steering ratio as previously described required three revolutions of the steering wheel to turn the wheel from stop to stop, actuation of the solenoid piston would thus change the amplification ratio so that one and one-half to two turns of the steering wheel would be required.

The Alternate Embodiment of FIG. 4

An alternate embodiment of the flow amplifier valve assembly, having reference to FIG. 4, is employed in combination with similar components as were described with reference to FIG. 1. Those similar components are indicated by a primed numeral of equal value as for the same component in FIG. 1. For example, steering jacks 16' and 17' are similarly positioned upon an articulated vehicle as in FIG. 1 so that the delivery of hydraulic fluid through conduits 31' or 32' will accomplish a similar steering maneuver as would delivery of fluid through the conduits 31 and 32 respectively of FIG. 1. A pump 18' provides fluid from a tank 27' through a conduit 19' and check valve 128' to a metering unit 21' driven by a shaft 22'. Rotation of the metering unit transfers fluid into either conduit 23' or 24' as with the embodiment of FIG. 1. A return path to drain from the control valve system and the metering unit is provided by conduits 64' and 28'. A conduit 34' delivers pump fluid to the control valve system.

The alternate flow amplifier valve assembly is contained within a single housing 201 and comprises equivalent components performing generally equivalent functions as the components in the flow amplifier assembly of FIG. 1. However, the structure and the physical inter-relation of those components is substantially different. For example, two steering control valves, designated 202 and 202a, are together equivalent to the steering control valve 29 of FIG. 1. Load piston 203, blocker valve 204 and lock valve 206 are generally equivalent to the similarly identified components indicated at 33, 36 and 37 in FIG. 1. Poppet valve 207 is equivalent to poppet valve 41 in FIG. 1 and shuttle valve 208 is equivalent to the shuttle valve 94 of FIG. 1. Just as steering valve 202 and 202a form symmetrical halves of a steering valve similar to that indicated at 29 in FIG. 1, flow paths through the blocker valve 204, shuttle valve 208 and lock valve 206 are provided by symmetrically opposite features of those components depending upon whether the vehicle is to be turned into one direction or the other. Accordingly, this control valve system will be described with reference to a leftward turning maneuver similar to that described with reference to FIG. 1, that is, where jack 16' is to be retracted and jack 17' is to be extended. The symmetrically opposed features which perform the same functions during a turning maneuver in the other direction are identified by the same numeral and distinguished by addition of the letter a.

To briefly describe the valve components, steering valves 202 and 202a respectively comprise spools 209 and 209a disposed for longitudinal motion in respective bores 211 and 211a. Both spool bores 211 and 211a are in free communication with the conduit 34' from the pump by means of an inlet passage 212 formed in the valve housing. The blocker valve 204 has a spool 213 normally positioned within a bore 214 according to a single preloaded centering spring 216. The blocker spool bore 214 is in communication with each of the steering spool bores 211 and 211a by means of downstream passages 217 and 217a respectively. Passage 217 communicates by means of another passage 218 with a chamber 219 formed at the left end of the blocker spool in its bore 214. Similarly, a passage 218a communicates passage 217a with a chamber 219a, formed at the right end of the blocker spool 213. Free fluid communication between the passage 218a and the chamber 219a is insured by a slot 221 formed in the valve housing. Conduit 31' is communicated with the blocker spool bore adjacent communication-passage 217 therewith by means of a passage 222. A similar passage 222 a communicates with conduit 32' with the blocker spool bore adjacent communication of the passage 217a therewith. Lock valve 206 comprises a spool 223 normally positioned in a bore 224 by means of a spring 226. With the lock valve spool 23 in its normal position according to the spring 226, conduits 23' and 24' are in communication thereacross with passages 227 and 227a respectively. Passage 227 is also in communication with a chamber 228 formed at one end of the steering spool bore 211 while the passage 227a is in communication with a similar chamber 228a formed at one end of the steering spool bore 211a. The shuttle valve 208 comprises a spool 229 free for longitudinal motion in a bore 231. A chamber 232 formed in the steering spool bore 211 across the spool 209 from the chamber 228, is in communication with one end of the shuttle spool by a passage 233. A similar chamber 232a in the bore 211a is communicated to the other end of the shuttle spool by a passage 233a. The shuttle spool bore 231 is in communication with a chamber 234 by means of another passage 236. One end of the shuttle spool 229 contains a notch 237 so that when fluid enters the shuttle spool bore from passage 233 it is communicated to passage 236 via the notch 237. Fluid pressure acts on the shuttle spool 229 and causes it to shift leftwardly. A similar notch 237a is formed at the other end of the shuttle spool to provide communication between passages 233a and the passage 236.

In operation, the various components are positioned as shown prior to start up of the pump 18'. Operation of the pump 18' delivers fluid through conduit 19' and conduit 34' into inlet passage 212 where it is blocked by normally positioned steering valve spools 209 and 209a. Resulting pressure rise in the inlet passage 212 is communicated to a tubular chamber 238 in the front of the load piston 203 by means of a passage 239 and tends to urge the load piston against its spring 234. As the load piston rises, multiple orifices 241 formed about the load piston chamber 238 permit fluid from the chamber 238 to flow back to the drain through the conduit 64'.

Thus, pressure in the inlet passage 212 rises to a preselected level according to the selected strength of the spring 242 behind the load piston. This pressure also exists in conduit 19' to insure a suitable pressure drop between conduits 19' and 28' for proper operation of the metering unit 21'.

Upon rotation of the metering unit 21' to accomplish a leftward turn, for example, it transfers fluid from conduit 19' into conduit 23'. Fluid from conduit 23' enters passage 227 across the normally open lock valve 206 and passes into the chamber 228. The steering valve spool 209 has a cross passage 243 which remains in communication with the passage 217. Fluid from chamber 228 is communicated into cross passage 243 and then into the passage 217 by means of an orifice 244. The pressure drop caused by the orifice 244 results in the steering valve 209 being shifted upwardly at a rate dependent upon the flow of fluid into chamber 228 from the metering unit. The steering valve spool 209 has an annular channel 246 which rises into varying communication with the inlet passage 212 as the spool 209 is shifted upwardly. Fluid which enters the annular channel 246 from the inlet passage 212 is communicated into the cross passage 243 through multiple orifices 247 so that pump fluid from the inlet passage 212 is communicated into passage 217 for delivery to the steering jacks. Fluid from the annular channel 246 also passes through additional bores 248 formed in the spool 209 into the chamber 232 and through passage 233 to the shuttle valve. The fluid pressure shifts the shuttle spool leftwardly as discussed above and is thereupon communicated into passage 236 and then into chamber 234 behind the load piston 203. At a given point in time, pressure in chambers 228 and 232 across the spool 209 as well as the pressure in the annular channel 246 will be generally equal and that pressure is communicated into the chamber 234. Since that pressure cooperates with the spring 242 to urge the load piston downwardly, and limit flow of fluid from inlet passage 212 to drain, the fluid circuit described immediately above provides for pressure compensation of fluid in the inlet passage 212 similary as in the embodiment described with reference to FIG. 1.

Since the pressures in passage 228 and annular channel 246 tend to be equal, the ratio of pilot flow from chamber 228 and pump flow from annular channel 246 are in direct proportion to the ratio determined by the cross sectional area of the orifice 244 and the combined cross sectional area of the orifices 247. This ratio establishes the amplified pump flow to the jacks as compared to pilot flow and thus determines the steering ratio for the control system. Since the orifice 244 is always open to fluid flow and thus able to pass fluid flow from chamber 228 to passage 243, it is apparent that machining of the spool 209 (and similarly spool 209a) is less critical than with the steering spool described with reference to FIG. 1. This is due primarily to the fact that only one combined flow path is established in the present embodiment whereas two flow paths were established simultaneously in the first embodiment to accomplish a steering maneuver. It is to be noted that the pressure drop across the orifice 244 always moves the spool 209 upwardly sufficiently to satisfy the full flow requirements of the orifices 247 as well as the orifice 244.

The rising fluid pressure in the passage 217 enters chamber 219 through the passage 218 and urges the blocker spool 213 rightwardly to permit communication from the passage 217 into the outlet passage 222 and then to the steering jacks through conduit 31'.

When rotation of the metering unit 21' is terminated, pilot flow through conduit 23' ceases and steering spool 209 is returned to its normal downward position by fluid pressure existing in load piston chamber 234 and accordingly in chamber 232 above the steering spool. In this manner, fluid flow to the passage 217 is terminated and the blocker spool accordingly returns to its centered position to isolate both outlet passages 222 and 228 to fix the jacks for a given turning radius. In the operation described immediately above, while passage 217 is in communication with outlet passage 222, outlet passage 222a is in communication across the shifted blocker spool with another drain passage 249 formed generally at the center of the blocker spool bore. Thus, as fluid is provided into the rod end of jack 16' and the head end of jack 17', the head end of jack 16' and the rod end of jack 17' are communicated to drain for proper operation of the steering jacks.

The blocker valve 204 functions similary as described in the first embodiment for the blocker valve 36 of FIG. 1 to relieve over-pressure arising in the steering jacks, for example, upon encountering an obstruction in the roadway which tends to force the vehicle into a leftward turning maneuver. Resulting pressure rise in the conduit 31' is communicated to the blocker spool bore through the passage 222. A port 251 is formed by the blocker spool in communication with the passage 222 and in communication with an axial bore 252 in the right end of the blocker spool. A slug 253 is disposed for longitudinal motion in the axial bore 252 so that fluid pressure in passage 222 enters bore 251 and interacts between the slug 253 and the spool 213 within the axial bores 252 to urge the blocker spool 213 leftwardly in its bore. Leftward motion of the blocker spool 213 communicates the passage 222 with the center drain passage 249 across the blocker spool bore so that overpressure in the steering jacks of a preselected level is vented to drain to protect those hydraulic components. That preselected pressure level is determined by the strength of the spring 216.

To turn in the other direction or if an obstruction in the roadway tends to turn the vehicle in the opposite direction, the flow amplifier valve functions similarly through its symmetrically opposite flow paths.

The lock valve 206 functions similarly as the lock valve 37 in FIG. 1 to prevent steering wheel slippage in the event maximum operating pressure is exceeded within the control valve system for example, from malfunctioning of one of the control valve system components. Resulting excessive pressure arises in inlet passage 212 and is reflected in load piston chamber 234 so that the poppet valve 207 operates to release excess pressure into a passage 254 which communicates with the tubular right end of the lock valve spool. The fluid under pressure then passes through a port 256 formed in the lock valve spool and into a passage 257 which is in free communication with the drain conduit 64'. However, since a pressure drop exists across the port 256, the lock valve spool 223 is shifted leftwardly to prevent respective communication of conduits 23' and 24' with passages 227 and 227a. In this manner, the metering unit 21' is isolated from the steering control system during relief operation of the poppet valve 207 to prevent steering wheel slippage as described above.

An additional advantage of the present embodiment lies in the much simpler means by which dual ratio steering may be accomplished. A simple air actuated valve 261 or 261a is associated with each of the steering valve spools 209 and 209a respectively. Selective actuation of the valve 261, for example, provides an additional fluid flow path from the annular channel 246 of spool 209 into the passage 217 in parallel with the orifices 247. If the cross-sectional area of the flow path through the air actuated valve is, for example equal to the cross-sectional area of the orifices 247, actuation of the valve 261 doubles the amplification ratio of pump fluid flow to the jacks as compared to pilot flow. The steering ratio is also increased as was discussed with reference to the embodiment of FIG. 1. To vary the steering ratio, valve 261 comprises a spool 262 positioned in a bore 263 by means of a spring 264. The separate passages 266 and 267 communicate the spool bore 263 with the annular channel 246 of spool 209 and the passage 217 respectively. When the spool 262 is normally positioned by its spring, it prevents fluid communication between the passages 266 and 267. However, upon introduction of air pressure through a port 268 (by conventional means which are not shown) into the spool bore 263, the spool is shifted downwardly against its spring to permit fluid communication between passages 266 and 267. By this means, an additional fluid path is opened up which is parallel to the orifices 247 and the amplification factor and steering ratio are increased as discussed above.

The present embodiment also permits the operator to hydraulically accomplish a steering maneuver in the event of a pressure failure similarly but in a somewhat different manner from the embodiment described in FIG. 1. If an engine (not shown) driving the pump 18' is stalled, all of the valve components assume the position shown in FIG. 4. As with the metering unit and pump described in FIG. 1, rotation of the metering unit 21' directs fluid into either of conduits 23' and 24'. Fluid in the conduit 23' passes across the lock valve 206 into passage 227 and from there into the chamber 228 below to the spool 209. The spool is shifted upwardly as in normal operation. However, a check valve 271 disposed across the conduit 34' prevents reverse flow out of inlet passage 212. The fluid in chamber 228 is thus forced to pass into the passage 217. Fluid entering end chamber 219 from passage 218 shifts the blocker spool rightwardly to communicate the passage 217 with passage 222 across the blocker valve so that the pilot flow described above is directed to the steering jacks. As in normal operation, the other conduit 32' is communicated to drain through passages 222a and 249a by means of the blocker spool bore to permit proper response of the steering jacks.

The Alternate Embodiment of FIG. 5

A simplified version of the flow amplifier valve of FIG. 4 is shown in FIG. 5. Simplification of the present embodiment is due basically to utilization of a single steering control spool 301 which performs the function of both steering control valves 202 and 202a as well as the blocker valve 204 in FIG. 4. Hydraulic fluid from the pump 18'' is delivered directly to the steering control spool by means of a central inlet passage 302. Fluid from the steering spool is communicated to the steering jacks through either of downstream conduits 303 and 304 which correspond to downstream passages 217 and 217a respectively of FIG. 4. A similar load piston assembly 203' is associated with the steering spool to provide pressure compensation in the inlet passage 302. The shuttle valve 208 of the embodiment in FIG. 4 is replaced by a feed back pressure selector valve 306 and a signal pressure selector valve 307 to reduce the complexity and number of hydraulic fluid passage in the valve housing. Since the steering spool 301 and the selector valves 306 and 307 are of symmetrical construction, the present embodiment will also be described with reference to only a single turning maneuver as with the embodiment of FIG. 4.

The steering control spool is normally positioned within a bore 308 in response to a single preloaded centering spring 309. The steering ratio, that is the ratio of pump fluid flow compared to pilot flow, is determined by the relative cross-sectional area of a pair of orifices, for example, 309 and 311, associated respectively with each of the outlet conduits 303 and 304 downstream of the steering control spool. The signal pressure selector valve 307 comprises a spool 312 having centering springs 313 and 314. The feed back pressure selector valve 306 comprises a shuttle valve 316 disposed for free longitudinal motion within a bore 317. Each end of the feed back selector bore 317 is in communication with one of the conduits 23'' and 24'' from the metering unit 21''.

In operation, the components are initially positioned as shown. Operation of the pump provides fluid through conduits 19'' and 34'' to the inlet passage 302 which is blocked by the normally positioned main steering spool 301. Fluid pressure accordingly builds up in the face chamber 238'' of the load piston 203' so that it is urged rightwardly against its spring 242'. As the load piston shifts rightwardly, the multiple orifices 241' communicate the inlet passage 302 to drain through conduits 64''. Pressure in the inlet passage 302 is then determined by the strength of spring 242' which insures sufficient pressure in conduits 19'' for proper operation of the metering unit 21''. Rotation of the metering unit, to accomplish a steering maneuver, causes pilot fluid to be directed to the feed back pressure selector valve 306 through conduit 23'', for example. The fluid pressure acts against the left end of the shuttle spool 316 urging it rightwardly in its bore so that fluid from conduit 23'' is communicated to a passage 317 which is also in communication with a chamber 318 formed by the left end of the steering spool 301 in its bore 308. The chamber 318 is in communication with the left end of the signal selector spool 312 through a conduit 319 so that fluid from conduit 317 acts rightwardly against both the steering spool 301 and the signal selector spool 312. However, the centering springs for the signal selector spool are of lesser strength than the centering spring for the main steering spool so that the signal selector spool is shifted rightwardly first. Rightward shifting of the signal selector spool communicates the passage 319 with another passage 321 by means of the bore 313. The passage 321 communicates through the smaller orifice 311 into the outlet passage 303. After the signal selector spool is shifted rightwardly, pilot fluid pressure continues to rise and shifts the main steering spool 301 rightwardly against its centering spring 309. Rightward shifting of the main steering spool communicates fluid from the inlet passage 302 across the steering spool bore 308 and through the larger orifice 309 into the outlet passage 303 where it is combined with flow from the other orifice 311. It has been found in such metering arrangements that the upstream pressure from each of the orifices 309 and 311 will be substantially equal during a turning maneuver. Fluid immediately upstream of the larger orifice 309 is communicated into a passage 322. The rightward shifted signal selector spool communicates the passage 322 with another passage 323 which is also in communication with the main steering spool bore 308 at the right end of its spool and with the right end of the signal pressure selector spool 312. Fluid from the right end of the steering spool is communicated back to the pressure selector valve bore 317 by another passage 324. While the shuttle valve 316 is positioned rightwardly by the pilot flow described above, it communicates the passage 324 with another passage 326 which is also in communication with the chamber 234' behind the load piston 203'. Thus, fluid pressure immediately downstream of the steering spool cooperates with the spring 309 to shift the steering spool leftwardly against pressure in chamber 318 as well as cooperating with the load piston spring 242' to shift the load piston 203' leftwardly. While the upstream pressure for both orifices 309 and 311 are equal, their downstream pressures are also equal since they combine in outlet passage 303 so that there will be an equal pressure drop across both of the orifices. This flow arrangement provides two important features in the present valve. First, the main steering spool is shifted rightwardly to allow sufficient flow into the orifice 309 to maintain the pressure drop thereacross equal with the pressure drop across the other orifice 311. In this manner, flow of pump fluid to the steering jacks is directly proportional to pilot flow from the conduit 23''. Provision of fluid pressure downstream from the main steering spool to the chamber 234 behind the load piston provides for pressure compensation of the fluid in the inlet passage 302 in a similar manner as was described with reference to the embodiments of both FIGS. 1 and 4. When the operator ceases the rotation of the metering unit 21'' and terminates pilot flow into the flow amplification valve from conduit 23'', the main steering spool 301 is again shifted leftwardly to its centered position. In this position, it functions as a blocker valve to isolate the steering jacks and fix their operating position. Upon termination of pilot flow, the signal selector spool 312 is also returned to its centered position to block both the passages 321 and 322. During the above described steering maneuver, rightward shifting of the steering spool 301 communicates the opposite outlet passage 304 with a drain conduit 327 to permit proper extension or retraction of the steering jacks.

The present embodiment also incorporates a poppet valve 207' which functions similarly as the poppet valve 207 in FIG. 4.

The present embodiment also provides for protection of the hydraulic components in case external forces acting upon the vehicle create overpressure in the steering jacks, for example, the rod end of jack 16'' and the head end of jack 17''. Such overpressures are normally blocked by the steering spool as discussed above. However, if that overpressure exceeds a preselected maximum value, for example 2,500 psi, a blocker poppet 328 disposed in a passage 329 in communication with the outlet passage 303 unseats and relieves pressure from outlet passage 303 into the passage 329. The passage 329 is also in communication with the right end of the main steering spool while the passage 324 is blocked by the feed back pressure selector spool since there is no pilot flow. Accordingly, the steering spool is shifted leftwardly and communicates the outlet passage 303 with the split drain passage 327 to eliminate over-pressure in the steering jacks.

A check valve 331 disposed across the conduit 19'' to prevent fluid flow from the metering unit to the pump prevents backlash in the metering unit and the steering wheel during the condition described immediately above similarly as with the embodiment of FIG. 4.

Another check valve 332 prevents back flow from the inlet passage 302 to the pump 18'' so that the operator may maintain limited hydraulic steering control when pump 18'' is not operating. This function is similar to that described for the embodiment in FIG. 4.

Although the present invention is described above with reference to three specific embodiments, it is apparent that numerous modifications are possible within the scope of the present invention. For example, a dual ratio steering system is easily attainable in the embodiment of FIG. 5 with a valve similar to that indicated at 261 in FIG. 4 to selectively provide an additional fluid flow path in parallel with the orifice 309.

Further, the embodiment of FIG. 4 may be simplified to achieve a modification of the embodiment in FIG. 5. For example, in FIG. 5 the main steering spool has a single inlet passage 302 and a split drain passage 327 in communication with each end of the steering spool. A functionally similar valve could be achieved from the embodiment of FIG. 4 by removing the two steering control valves 209 and 209a to freely communicate fluid to each end of the blocker spool 213 through passages 217 and 217a. This split inlet arrangement and the single central drain passage 249 would permit that valve to function similarly as the valve described with reference to FIG. 5. It would be additionally necessary to modify the other valve components of FIG. 4 in accordance with the description referencing FIG. 5. The embodiment of FIG. 1 could similarly be modified in accordance with the embodiment of FIG. 5.

A lock valve, similar to that described in FIG. 4, could also be employed in the embodiment of FIG. 5. For example, it could suitably cross the internal passages communicating conduits 23'' and 24'' to the feed back pressure selector valve and be in fluid communication with the rear of poppet valve 207'.

The neutralizer valves of FIG. 1 could similarly be employed with the embodiments of either FIG. 4 or FIG. 5.

We claim:

1. In combination, a flow amplifier valve assembly for regulating the flow of fluid from a source to a fluid motor means in response to a fluid metering valve unit which is operable to transfer fluid thereacross at a rate proportional to a desired rate of operation of the fluid motor means, including a source fluid inlet, means for receiving fluid transferred by the metering valve unit, a control valve means in communication with said source fluid inlet and said motor means and communicated with said receiving means to be responsive to metering fluid flow therein, said control valve means being pilot operated by said metering fluid flow to direct source fluid to the motor means at an amplified flow rate proportional to said pilot flow from the metering valve unit, pressure compensating means in communication with said source fluid inlet, shuttle valve means operatively coupling said control valve means and said pressure compensating means, said pressure compensating means being operable in association with said control valve means to regulate fluid pressure in the source fluid inlet, and blocker valve means in communication with said control valve means for normally blocking fluid communication to the motor means and establishing the controlling position of the motor means, said blocker valve means being responsive to said amplified flow to permit its passage to the motor means, said control valve means comprising a symmetrical pair of slidable spools in communication with source inlet fluid and normally blocking flow therefrom to respective downstream passages separately communicating each symmetrical spool with said blocker valve means, each symmetrical spool forming one orifice for communicating pilot flow to its respective downstream passage and another orifice for communicating source inlet fluid to its respective downstream passage, pilot flow across the one orifice creating a pressure drop which shifts the spool to permit source fluid to flow across the other orifice with an equivalent pressure drop.

2. The combination of claim 1 wherein dual ratio valve means are provided and are operable to provide an additional orifice which is parallel to and experiences the same pressure drop thereacross as said other orifice.

3. The combination of claim 2 wherein a relief valve is associated with the pressure compensating means to vent excess pressure therefrom, a lock valve normally communicates pilot flow from the metering valve unit to said symmetrical spools and is operable in response to fluid pressure vented by said relief valve to block said pilot flow, and a one way check valve is disposed between the fluid source and the source fluid inlet to prevent flow from the inlet to the source.

* * * * *